United States Patent [19]
Suzuki et al.

[11] Patent Number: 5,307,338
[45] Date of Patent: Apr. 26, 1994

[54] APPARATUS FOR RECORDING AND/OR REPRODUCING INFORMATION

[75] Inventors: Kazunori Suzuki, Yokohama; Shigeto Kanda, Machida; Tomoyuki Hiroki, Kamakura; Hideki Hosoya, Kawasaki, all of Japan

[73] Assignee: Canon Kabushiki Kaisha, Tokyo, Japan

[21] Appl. No.: 86,373

[22] Filed: Jul. 6, 1993

Related U.S. Application Data

[63] Continuation of Ser. No. 798,364, Nov. 21, 1991, abandoned, which is a continuation of Ser. No. 356,898, May 25, 1989, abandoned.

[30] Foreign Application Priority Data

May 25, 1988 [JP] Japan ............................ 63-128006
May 22, 1989 [JP] Japan ............................ 1-129289

[51] Int. Cl.$^5$ ............................................. G11B 17/04
[52] U.S. Cl. ........................... 369/191; 369/75.2; 360/99.07; 235/486
[58] Field of Search ............... 369/43, 44.11, 44.14, 369/44.27, 75.1, 75.2, 77.1, 99, 100, 111, 191, 196, 258, 263, 264, 270, 271, 272, 273, 275.1; 235/435, 439, 454, 470, 486; 360/99.06, 99.07, 135

[56] References Cited

U.S. PATENT DOCUMENTS

| | | | |
|---|---|---|---|
| 4,005,280 | 1/1977 | Nunzio et al. | |
| 4,482,993 | 11/1984 | Agostini | 369/258 X |
| 4,592,042 | 5/1986 | Lemelson et al. | 369/258 |
| 4,669,009 | 5/1987 | Naoi et al. | 360/99 |
| 4,730,299 | 3/1988 | Kamoshita et al. | 369/264 |
| 4,734,794 | 3/1988 | Mehnert et al. | 360/2 |
| 4,800,551 | 1/1989 | Norris | 369/271 X |
| 4,829,168 | 5/1989 | Nakahara | 235/487 X |
| 4,868,373 | 9/1989 | Opheij et al. | 369/111 X |
| 4,916,687 | 4/1990 | Endo | 369/258 X |
| 4,918,553 | 4/1990 | Suzuki et al. | 369/258 X |
| 4,949,328 | 8/1990 | Kase et al. | 369/75.2 |
| 4,950,877 | 8/1990 | Kurihara et al. | 235/480 |
| 4,969,138 | 11/1990 | Ikedo et al. | 369/36 |
| 5,047,881 | 9/1991 | Uehara | 360/99.05 |
| 5,051,849 | 9/1991 | Fukushima et al. | 360/69 |
| 5,069,597 | 12/1991 | Doctor | 414/788.7 |
| 5,072,317 | 12/1991 | Fukushima et al. | 360/71 |
| 5,091,898 | 2/1992 | Bessho et al. | 369/77.2 |

FOREIGN PATENT DOCUMENTS

| | | |
|---|---|---|
| 230069 | 7/1987 | European Pat. Off. |
| 292720 | 11/1988 | European Pat. Off. |
| 60-061952 | 8/1985 | Japan |
| 60-170067 | 1/1986 | Japan |
| 61-190721 | 8/1986 | Japan |
| 8605620 | 9/1986 | PCT Int'l Appl. |

*Primary Examiner*—Bentsu Ro
*Attorney, Agent, or Firm*—Fitzpatrick, Cella, Harper & Scinto

[57] ABSTRACT

An information recording and/or reproducing apparatus comprises a head section to record and/or reproduce information onto/from an information recording medium having a shape other than a circular shape, holding device for holding the information recording medium and rotating the medium, moving device for moving the holding device in a predetermined direction, detecting device for detecting a rotating position of the information recording medium held to the holding device, and control device for controlling movable guide device in correspondence to a signal from the detecting device.

10 Claims, 9 Drawing Sheets

START OF ROTATION

APPARATUS FOR RECORDING AND/OR REPRODUCING INFORMATION

This application is a continuation of application Ser. No. 07/798,364 filed Nov. 21, 1991, now abandoned, which is a continuation of application Ser. No. 07/356,898, filed May 25, 1989, now abandoned.

BACKGROUND OF THE INVENTION

1. Field of the Invention

The present invention relates to an ejecting mechanism of an information recording medium in, for instance, an optical information recording and/or reproducing apparatus for recording and/or reproducing information by using an information recording medium having. A shape other than a circular shape.

2. Related Background Art

Hitherto, a read only compact disc, a write once and read mostly (WORM) type optical disk, and the like have been known as optical information recording media. The study, development, and realization of an information processing system such as an electronic file system or the like using those recording media are being executed more and more. Further, in recent years, an information processing system using a card-shaped optical recording medium, i.e., an optical card which is superior to the disk-shaped recording medium in terms of portability, has also been highlighted.

For example, in U.S. Ser. No. 047,290 (same assignee), there have been proposed an optical recording medium in which concentric or spiral information tracks are formed on the surface of a rectangular card and an information recording and reproducing apparatus using such a medium.

FIG. 1 is a plan view of an optical card C having an almost rectangular card shape. Although the size of optical card C is not particularly limited, it is preferably sized such that the card can be enclosed in a pocket, purse, or the like and in the case of carrying the card, it is not too large nor small. For instance, the card is dimensionsed to approximately 85.6 mm × 54.0 mm. In FIG. 1, a circular recording area D in which a center position O of the optical card C is used as a center is formed on the surface of the optical card C. A number of concentric or spiral information tracks are arranged in the recording area D.

FIG. 2 is a perspective view of an optical information reproducing apparatus for reproducing information by rotating the optical card C. In FIG. 2, a turntable 1 onto which the optical card C is put is rotated by a spindle motor 2 attached below the turntable 1. A guide groove 3 having a width which is fairly larger than a length of short side of the optical card C is formed on the upper surface of the turntable 1. A leaf spring 4 is attached to one wall of the guide groove 3. When the optical card C is put on the guide groove 3, the card is pressed to the other wall of the guide groove 3 by the leaf spring 4. On the other hand, a pin-shaped stopper 5 is provided at one end of the guide groove 3. A lever 7 is rotatably attached at the other end of the guide groove 3 at a position around a pin 6 provided in the outside of the guide groove 3 on the turntable 1. One end of a coil spring 8 is attached to the turntable 1. The other end of the coil spring 8 is connected to the lever 7. The operational edge of the lever 7 presses the optical card C on the guide groove 3 to the stopper 5 by the tensile force of the coil spring 8.

The insertion and ejection of the optical card C into and from the turntable 1 are executed in a state in which the lever 7 is rotated around the pin 6 against the tensile force of the coil spring 8 and the operational edge of the lever 7 is moved out of the guide groove 3. The optical card C is inserted in the direction of an arrow X in the guide groove 3 and is moved to a position where the front edge of the card abuts on the stopper 5 while being pressed to the wall on the opposite side by the leaf spring 4. Thereafter, the lever 7 is come into contact with the card C and the card is fixed. In a state in which the optical card C is fixed by the leaf spring 4 and lever 7, the center position O of the recording area D is located onto the axial center of the rotating shaft of the spindle motor 2.

On the other hand, a feed screw 9 and a guide rail 10 are attached in parallel in the horizontal direction over the turntable 1. An optical head 11 is movably mounted to the feed screw 9 and guide rail 10. A female screw which engages the feed screw 9 is provided in the optical head 11. The optical head 11 is slidably attached to the guide rail 10. When the feed screw 9 is rotated by a drive motor (not shown), the optical head 11 is moved along the guide rail 10 and accesses the recording area D on the optical card C which is rotated by the spindle motor 2 in the direction of an arrow W, so that the recorded information can be reproduced.

In the foregoing example, the optical card C is ejected out in a state in which the operational edge of the lever 7 is moved out of the guide groove 3 as mentioned above. However, in the case of automatically ejecting out the optical card C, the alignment of the guide groove 3 needs to be accurately made to coincide with the ejecting conveying direction of the optical card C. If the matching accuracy in this case is low, not only a conveyance error occurs but also there is a danger such that the optical card C itself will be damaged.

On the other hand, in recent optical cards, there have been proposed many optical cards on each of which a mark such as characters, photographs, or the like is printed so that the operator can check the content of the optical card with the eyes. In the case of using such an optical card, it is natural for the operator to insert the optical card into the information recording and/or reproducing apparatus in a state in which the mark such as characters, photographs, or the like printed on the optical card is directed in such a direction as to be easily read by the operator and the card is ejected out in the same state as above. Further, such a method is also convenient upon operation. However, the above information recording and/or reproducing apparatus does not have means for accurately directing the optical card in the ejecting direction, so that such an operation cannot be executed and is inconvenient.

SUMMARY OF THE INVENTION

It is an object for the present invention to provide an information recording and/or reproducing apparatus having an ejecting mechanism of an information recording medium having a certain automatic ejecting function in which by providing means for accurately directing an information recording medium in the direction to carry out eject the information recording medium, the information recording medium can be ejected without damaging it.

To accomplish the above object, an information recording and reproducing apparatus of the present invention comprises: a head section to record and/or reproduce information onto/from an information recording medium having a shape other than a circular shape; holding means for holding the information recording medium and for rotating the medium; moving means for moving the holding means in a predetermined direction; detecting means for detecting a rotating position of the information recording medium held by the holding means; and control means for controlling a movable guide means in correspondence to a signal from the detecting means.

DETAILED DESCRIPTION OF THE PREFERRED EMBODIMENTS

Figure 1:
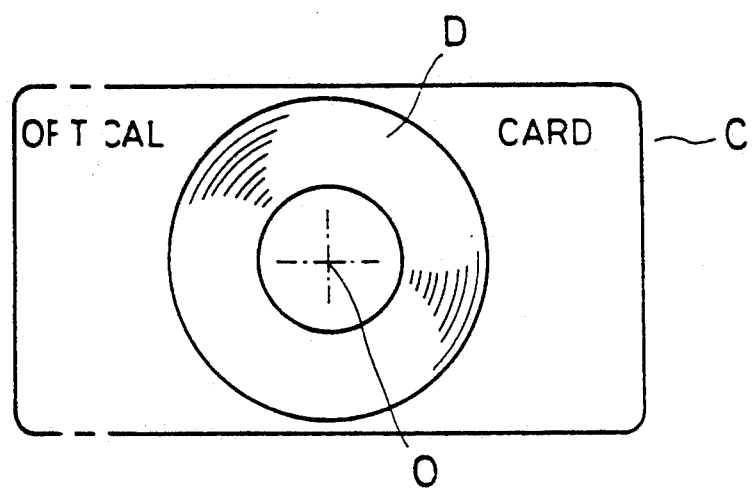
FIG. 1 is a plan view of an optical card.
Figure 2:
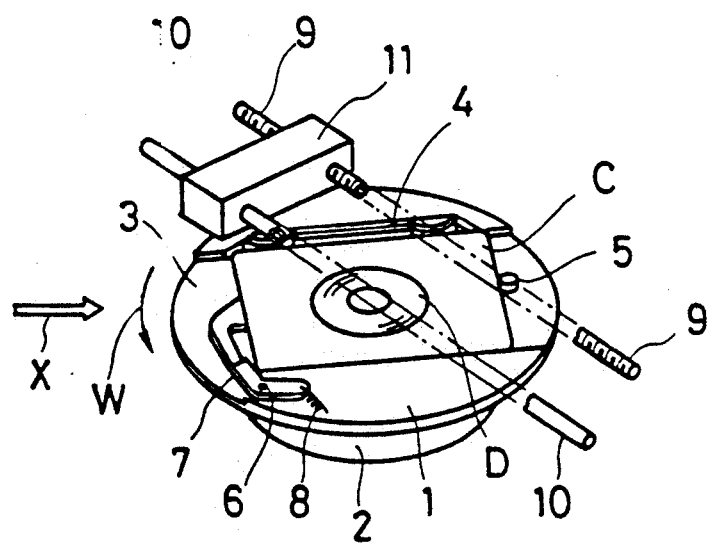
FIG. 2 is a perspective view of a conventional information recording and/or reproducing apparatus.

The present invention will be described in detail hereinbelow on the basis of an embodiment shown in the drawings.

Figure 3:
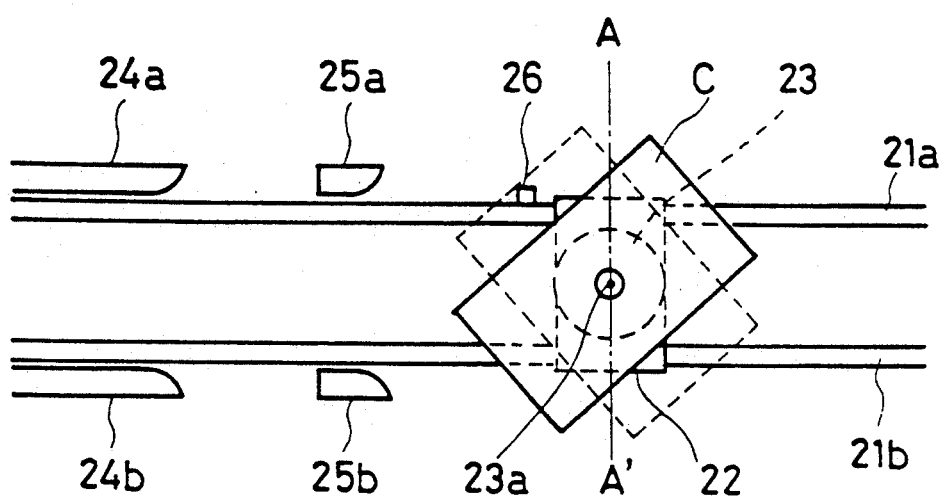
FIG. 3 is a plan view of the first embodiment.

FIG. 3 shows the first embodiment. A conveying base plate 22 is slidably mounted to two parallel rails 21a and 21b whose both ends are fixed to the main body of an information recording and/or reproducing apparatus. The conveying base plate 22 can be reciprocated by a linear motor (not shown) in the region from an optical card inserting/ejecting port of the apparatus on the left side in the drawing to a position A—A' to record and/or reproduce information by an optical head (not shown). A turntable 23 onto which the optical card C is put and a spindle motor (not shown) to rotate the base plate 23 are mounted onto the turntable 22. An outer diameter of the turntable 23 is smaller than a length of short side of the optical card C. The optical card C is set so that the center position O of the optical card C is located on the axial center of a center shaft 23a of the turntable 23. The optical card C is then fixed by a clamper from the upper position. The dimension between the rails 21a and 21b including the widths of the rails themselves is set to be almost equal to the length of the short side of the optical card C. Fixed guides 24a and 24b are arranged on both outsides of the rails 21a and 21b near the port for inserting/ejecting the optical card C and are spaced slightly wider than the length of the short side of the optical card C. Further, two auxiliary guides 25a and 25b are arranged on the insides along the rails 21a and 21b so as to face each other. The auxiliary guides 25a and 25b can move in the upper and lower directions, that is, in the directions perpendicular to the surface of the drawing paper. Namely, the guides 25a and 25b can move in the directions which are perpendicular to the surface of the recording medium on the optical card C. The guides 25a and 25b have side portions which are parallel with the rails 21a and 21b and also have guide portions whose inward sides are arc-shaped. On the other hand, the rotation of the turntable 23 is stopped at the position A—A' where information is recorded and/or reproduced onto/from the optical card C and the direction of the optical card C, that is, the rotating position of the optical card C is detected by a sensor 26. The sensor 26 is arranged on the outside of the rail 21a and at a position where the distance to the turntable center shaft 23a is shorter than the length which is ½ of the length of the long side of the optical card C. The sensor 26 comprises a photo reflector, photo interruptor, or the like and detects whether the optical card C is over the sensor 26 or not when the rotation of the turntable 23 is stopped. In other words, the sensor 26 detects the direction, namely, the rotated position of the optical card C put on the turntable 23.

On the other hand, a detection output of the sensor 26 is supplied to a drive control unit of the auxiliary guides 25a and 25b. In accordance with the output of the sensor 26, the guide 25a or 25b is selectively driven in the vertical direction. The sensor 26 can be also attached over the conveying base plate 22 without being fixed to the apparatus main body.

Figure 4:
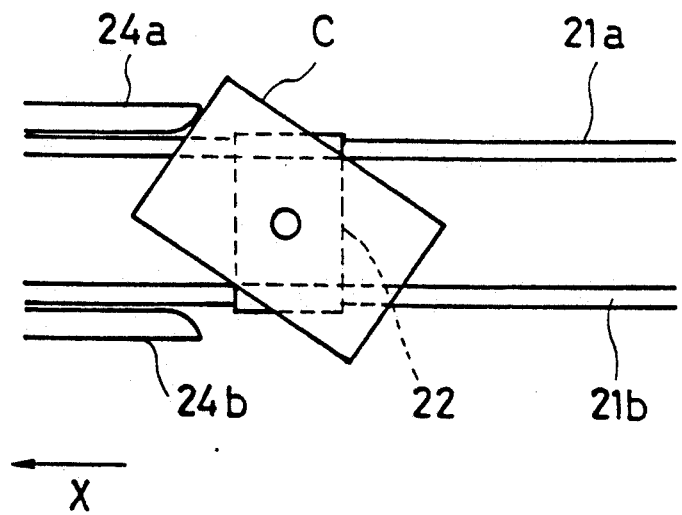
FIG. 4 is an explanatory diagram in the case where an optical card C is ejected out in an inclined state.

In the above construction, when loading, the optical card C inserted from the optical card inserting port is set onto the turntable 23 and is moved to the operational position A—A' of the optical head while the rotation of the card is restricted by the fixed guides 24a and 24b and the auxiliary guides 25a and 25b. After completion of the information recording and/or reproducing operation of the optical card C at the position A—A', the rotation of the turntable 23 is stopped by the stop of the rotation of the spindle motor. Thereafter, the conveying base plate 22 starts moving in the direction (X direction in FIG. 4, for instance) of the optical card ejecting port along the rails 21a and 21b. In this case, the long side of the optical card C is not always parallel with the rails 21a and 21b. In most of the cases, as shown in FIG. 4, the long side of the optical card C is directed obliquely to the rails 21a and 21b. Therefore, in such a state, the optical card C cannot pass through the region between the fixed guides 24a and 24b.

Figure 5:
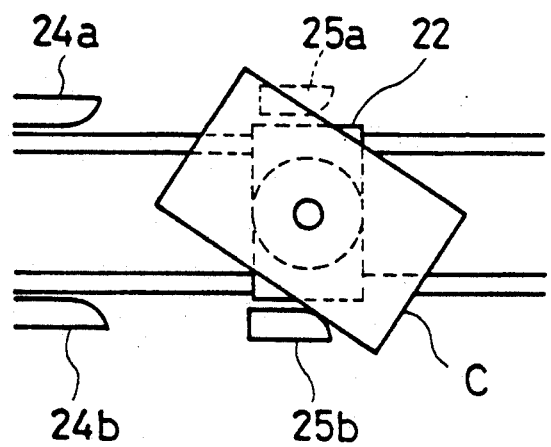
FIG. 5 is an explanatory diagram when the optical card is ejected out.

Therefore, in the embodiment, the direction of the optical card C is detected by the sensor 26 when the turntable 23 stops. If the optical card C exists over the sensor 26, the auxiliary guide 25a is put down. Next, by stopping the current supply to the clamper and/or spindle motor of the optical card C, the optical card C is set into the freely rotatable state. Then, the movement of the conveying base plate 22 is started. Thus, as shown in FIG. 5, the long side portion of the optical card C is rotated in contacting relation with the auxiliary guide 25b and is adjusted to the direction parallel with the rails 21a and 21b. Then, the optical card C is led to the region between the fixed guides 24a and 24b. On the contrary, if the optical card C is not positioned over the sensor 26, by putting down the auxiliary guide 25b contrarily, the similar direction control can be executed.

Figure 6:
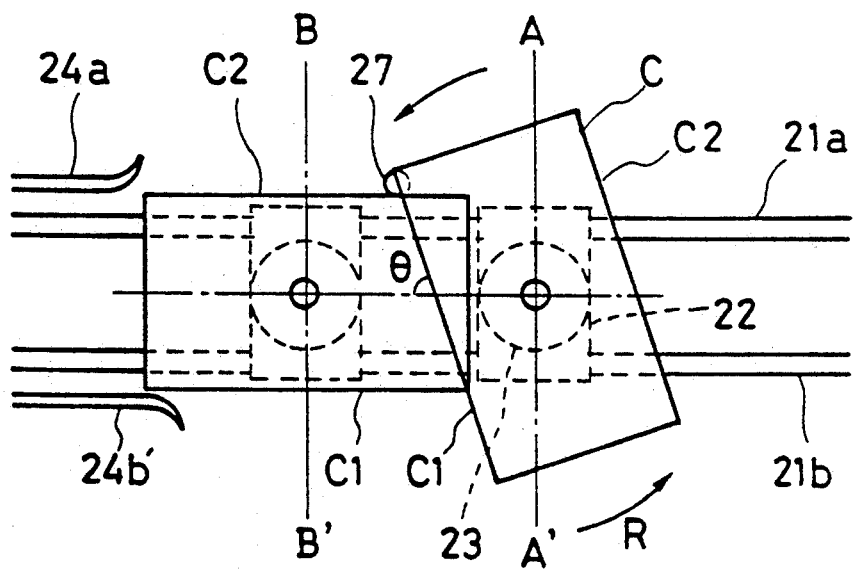
FIG. 6 is a plan view of the second embodiment.

FIG. 6 shows the second embodiment and the same parts and components as those shown in FIG. 3 are designated by the same reference numerals. In FIG. 6, a fixed guide 24b' is slightly longer on the inner side than the opposite fixed guide 24a. The edge portion of the fixed guide 24b' serves as a curved guide portion. On the other hand, a sensor 27 is arranged at a position on the outside portion of the rail 21a where the distance to the center shaft 23a of the turntable 23 is slightly shorter than ½ of the length of the long side of the optical card C when the optical card C rotates in the direction of an arrow R at the operational position A—A' of the optical head. The sensor 27 comprises a photo interruptor in which an LED and a phototransistor are arranged so as to face each other. The optical card C as a light shielding object passes through the region between the LED and the phototransistor. The sensor 27 can detect the passage of the long side portions $C_1$ and $C_2$ of the rotating optical card C. A detection output of the sensor 27 is input to a control unit using a linear motor to drive the conveying base plate 22.

Figure 7:
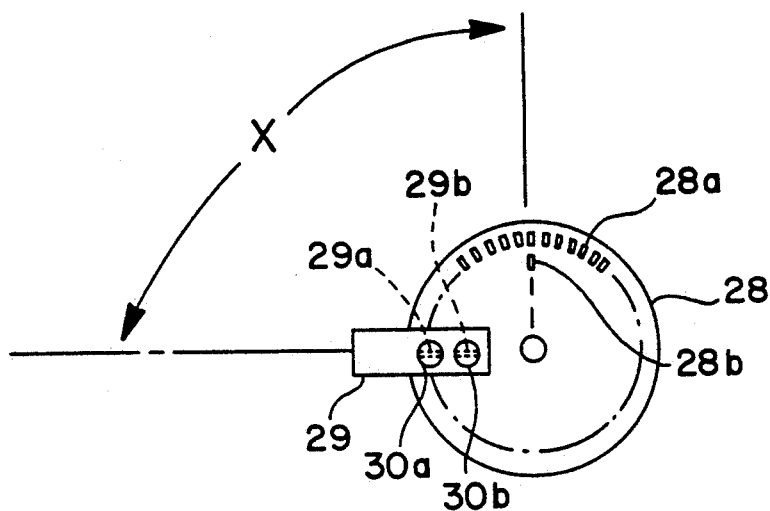
FIG. 7 is a plan view of a rotary encoder.

FIG. 7 shows an optical rotary encoder which is used in the second embodiment. The rotary encoder is attached to the spindle motor to rotate the turntable onto which the optical card C is put. The rotary encoder comprises: a slit plate 28 which is attached to the center shaft 23a of the turntable 23 and is rotated; and a photo interruptor 29 attached to a fixed portion of the spindle motor. A slit 28a having 360 windows per circumference is formed in the outer peripheral portion of the slit plate 28. A slit 28b having one window per circumference is arranged in the inner peripheral portion of the slit plate 28. On the other hand, a first LED (not shown) and a first phototransistor 30a are arranged so as to face the photo interruptor 29 through a fixed slit 29a. A second LED (not shown) and a second phototransistor 30b are arranged so as to face the photo interruptor 29 through a fixed slit 29b. The fixed slits 29a and 29b are arranged so as to face the slits 28a and 28b of the slit plate 28. Outputs of the first and second phototransistors 30a and 30b are input to the control unit of the linear motor to drive the conveying base plate 22.

Figure 8:
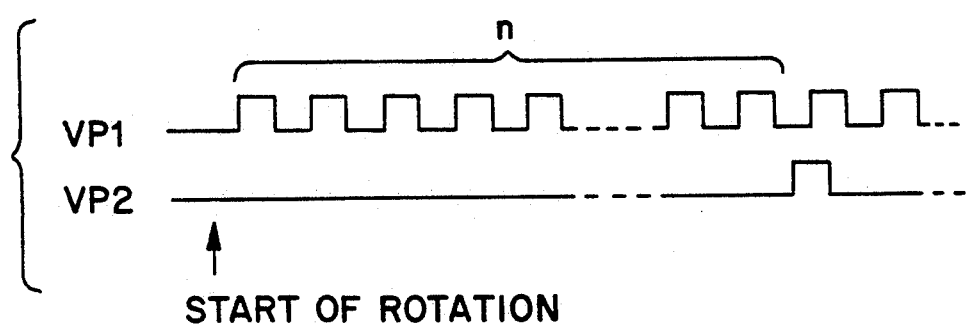
FIG. 8 is an explanatory diagram of output pulses.

In the above construction, upon loading, the optical card C is moved in parallel to the operational position by the operation similar to that in the first embodiment and starts rotating in the direction of the arrow R. When the turntable 23 rotates, 360 pulses are output per revolution from the first phototransistor 30a by the light fluxes which passed through the slit plate 28 and one pulse is output per revolution from the second phototransistor 30b. FIG. 8 shows output pulses $VP_1$ and $VP_2$ of the first and second phototransistors 30a and 30b of the photo interruptor 29. When n pulses $VP_1$ are output from the start time point of the revolution, the optical card C has rotated n degrees until the time point of the generation of the $n^{th}$ pulse. A numerical value of the pulses $VP_1$ detected is sent to the control unit of the linear motor. Thereafter, information is recorded and-/or reproduced while rotating the optical card C at an angular velocity of, for instance, 1000 r.p.m.

In the operation upon ejecting, assuming that the angles between the rails 21a and 21b and the long side portions $C_1$ and $C_2$ of the optical card C at the time point when the sensor 27 detects the passage of the long side portions $C_1$ and $C_2$ of the optical card C are $\theta$, the time point when the sensor 27 detects the long side portion $C_1$ coincides with the time point when the optical card C has rotated by only the rotational angle of $(360-X-\theta)°$, where X is an angle shown in FIG. 7, after completion of the generation of the most recent pulse $VP_2$, that is, the time point when $(360-X-\theta)$ pulses $VP_1$ were output. Therefore, the angular velocity of the optical card C is first reduced to 60 r.p.m. and the output of the sensor 27 is made effective only within the period from the 200th to the 250th pulse $VP_1$ after the most recent pulse $VP_2$ (In FIGS. 6 and 7 $\theta=45°$ and $X=90°$). From the time point when the effective output of the sensor 27 was obtained, the control unit of the linear motor starts moving the conveying base plate 22 in parallel.

In FIG. 6, it is now assumed that the position where the distance from the midpoint of side portion $C_1$ to the fixed guide 24b' is slightly shorter than ½ of the length of the long side of the optical card C is set to B—B'. By setting the moving speed of the conveying base plate 22 so that the base plate 22 reaches the position B—B' after the elapse of $\theta/360$ second after the base plate had started the parallel movement, the long side portion $C_1$ of the optical card C contacts the fixed guide 24b' at the time point when the long side portion $C_1$ becomes parallel with the rails 21a and 21b. Therefore, the optical card C is led to the region between the fixed guides 24a and 24b' while a degree of freedom in the rotating direction is restricted. Then, the card is ejected out in a state in which its direction is the same as that upon insertion. After the optical card C contacts the fixed guide 24b', the current supply to the clamper and/or spindle motor of the optical card C is stopped.

Figure 9:
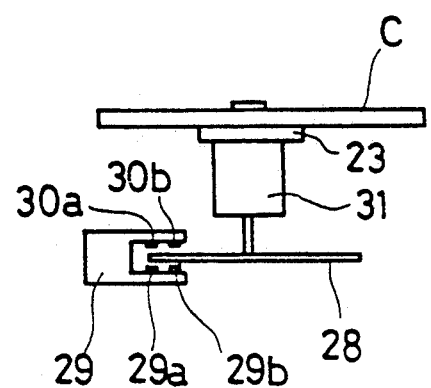
FIG. 9 is a cross sectional view of the third embodiment.

FIG. 9 shows the third embodiment. In a manner similar to the second embodiment, a rotary encoder is attached to a spindle motor 31 to rotate the optical card C. The rotary encoder comprises: the slit plate 28 which is attached to a center shaft of the spindle motor 31 and is rotated; and the photo interruptor 29 attached to a fixed portion of the spindle motor 31. As shown in FIG. 8, the slit 28a having, for instance, 360 windows per circumference is formed in the outer peripheral portion of the slit plate 28. The slit 28b having one window per circumference is formed in the inner peripheral portion of the slit plate 28. On the other hand, the first LED (not shown) and the first phototransistor 30a are arranged so as to face the photo interruptor 29 through the fixed slit 29a. The second LED (not shown) and the second phototransistor 30b are arranged so as to face the photo interruptor 29 through the fixed slit 29b. The fixed slits 29a and 29b are arranged so as to face the slits 28a and 28b of the slit plate 28.

In the above construction, the optical card C starts rotating. When the spindle motor 31 rotates, 360 pulses are output per revolution from the first phototransistor 30a and one pulse is output per revolution from the second phototransistor 30b by the light fluxes which pass through the slit plate 28.

FIG. 8 shows the output pulses $VP_1$ and $VP_2$ of the first and second phototransistors 30a and 30b of the photo interruptor 29. When n pulses $VP_1$ are output from the start time point of the rotation, the optical card C has rotated n degrees until the time point of the generation of the $n^{th}$ pulse. Therefore, $m=360-n$ indicates an angle for the period of time after the generation which the pulse $VP_2$ until the direction of the card faces again coincides with the direction at the start time point of the rotation. The control unit (not shown) stores the value of m and shuts off the power supply of the spindle motor 31 and reduces the speed at the completion of the revolution. When m pulses $VP_1$ are counted after the pulse $VP_2$ was output, the control unit transmits a brake command, thereby enabling the ejecting direction of the optical card C to be correctly adjusted. In this manner, the optical card C can also be stopped in the correct direction by the control unit to control the spindle motor in correspondence to the signal from the encoder.

Figure 10:
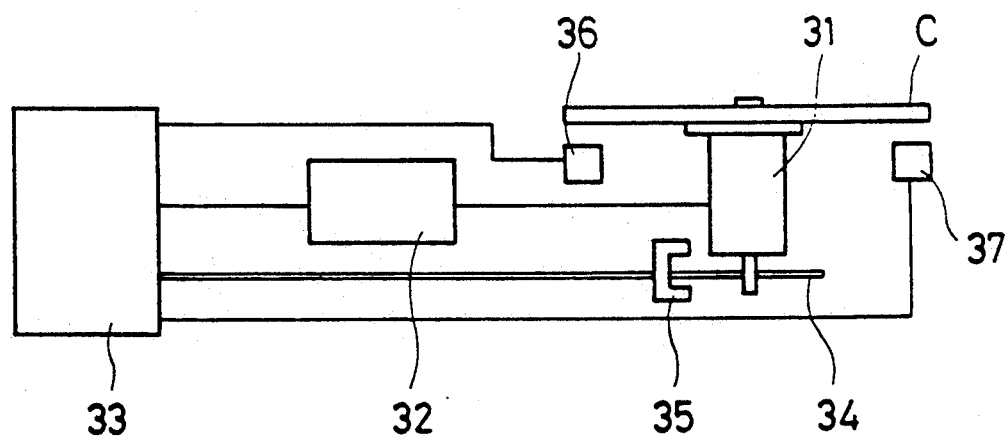
FIG. 10 is a constructional view of the fourth embodiment.

FIGS. 10 to 13 show the fourth embodiment. FIG. 10 shows a mechanism to adjust the ejecting direction of the optical card C. In FIG. 10, the spindle motor 31 which rotates the optical card C is connected to a control unit 33 through a motor driver 32 and is driven and stopped by a command from the control unit 33. On the other hand, a rotary encoder comprising a slit plate 34 and a photo interruptor 35 is attached to the spindle motor 31. Pulses of the frequency which is proportional to the rotating speed of the slit plate 34 are obtained from the photo interruptor 35 and transmitted to the control unit 33. On the other hand, two photosensors 36 and 37 of the light reflection type are arranged below the rotating optical card C. Outputs of the photosensors 36 and 37 are input to the control unit 33.

Figure 11:
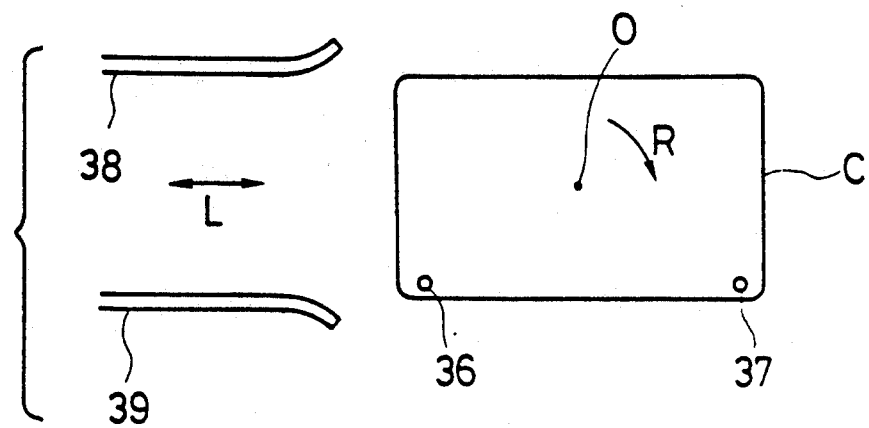
FIG. 11 is a plan view of the fourth embodiment.

FIG. 11 is a plan view showing a position arrangement of the photosensors 36 and 37. The photosensors 36 and 37 are arranged so as to detect two adjacent edge portions of the optical card C when the rotating direction of the optical card C coincides with an ejecting direction L along guide rails 38 and 39.

Figure 12A:
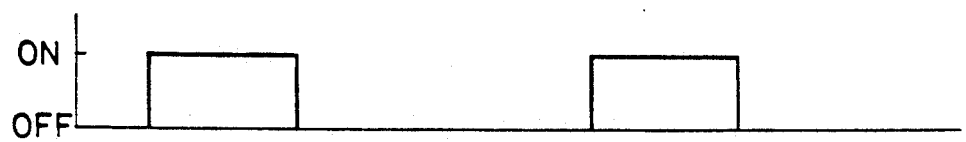
FIGS. 12A to 12C are explanatory diagrams of outputs of photosensors.
Figure 12B:
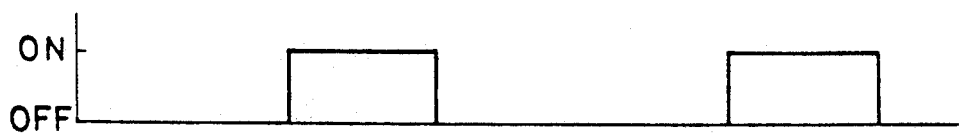
Figure 12C:

FIG. 12A shows a signal from the photosensor 36. FIG. 12B shows a signal from the photosensor 37. The signals of the photosensors 36 and 37 are set to the high level only for the period of time when the optical card C traverses over the sensors 36 and 37. FIG. 12C shows a signal indicative of the AND of the signals of FIGS. 12A and 12B. Therefore, when the AND signal of FIG. 12C is at the high level, the direction of the optical card C coincides with the ejecting direction L as shown in FIG. 11.

Figure 13:
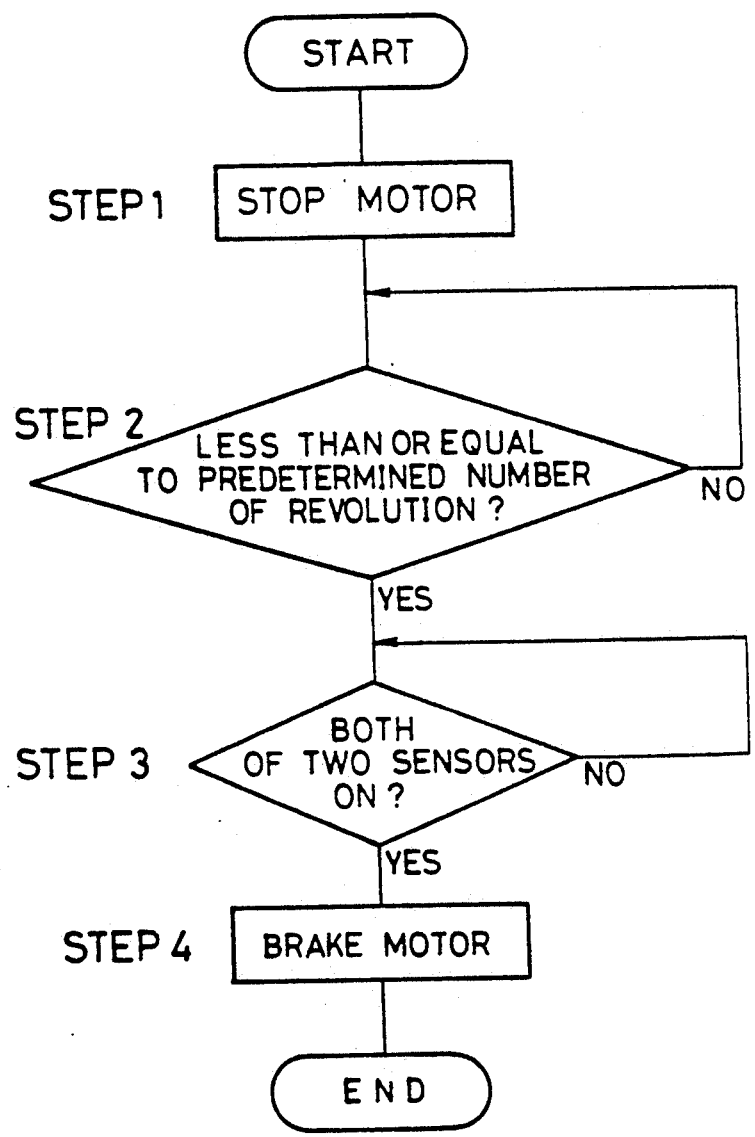
FIG. 13 is a flowchart for the fourth embodiment.

FIG. 13 is a flowchart showing a procedure to align the rotation stopping direction of the optical card C. In step 1, the power supply to the spindle motor 31 is stopped. In step 2, a check is made to see if the number of revolutions per minute of the spindle motor 31 is less than or equal to a predetermined number of revolutions per minute. Only when it is less than or equal to the predetermined number of revolutions per minute, step 3 follows. Only when both of the signals of the photosensors 36 and 37 are at the high level in step 3, step 4 follows. In step 4, a brake signal is transmitted to the motor driver 32 and the processing routine is finished.

In the above construction, when the control unit 33 disconnects the power supply of the spindle motor 31, the rotating speed of the spindle motor 31 gradually decreases while continuing the rotation due to the inertia of the spindle motor. A change in rotating speed is sequentially transmitted to the control unit 33 through the photo interruptor 35. When it is confirmed that the rotating speed is equal to or less than the predetermined rotating speed, the AND signal of the output signals of the photosensors 36 and 37 is set to the high level and, at the same time, a brake command is output to stop the rotation of the spindle motor. In this case, by setting the predetermined rotating speed of the spindle motor 31 to a low value such that the spindle motor 31 can be immediately stopped in response to the brake command and, further, by properly selecting the sensing positions, the angle between the stopping direction of the optical card C and the ejecting direction L can be adjusted to a value within a range of about ±2°. Therefore, as shown in FIG. 11, by slightly widening the edge portions of the guide rails 38 and 39, the optical card C can be certainly ejected. On the other hand, in the fourth embodiment, since the photosensors 36 and 37 are provided, the presence or absence of the optical card C can be also detected from an output signal upon rotation of the spindle motor 31.

Figure 14:
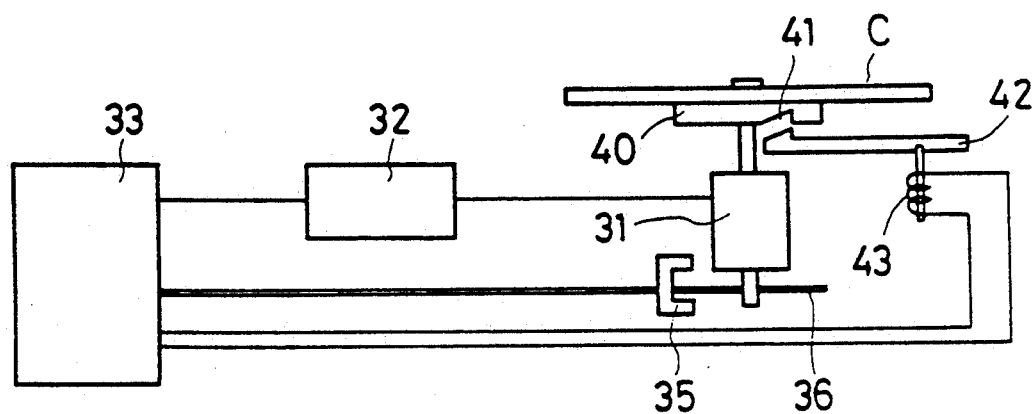
FIG. 14 is a constructional view of the fifth embodiment.
Figure 15:
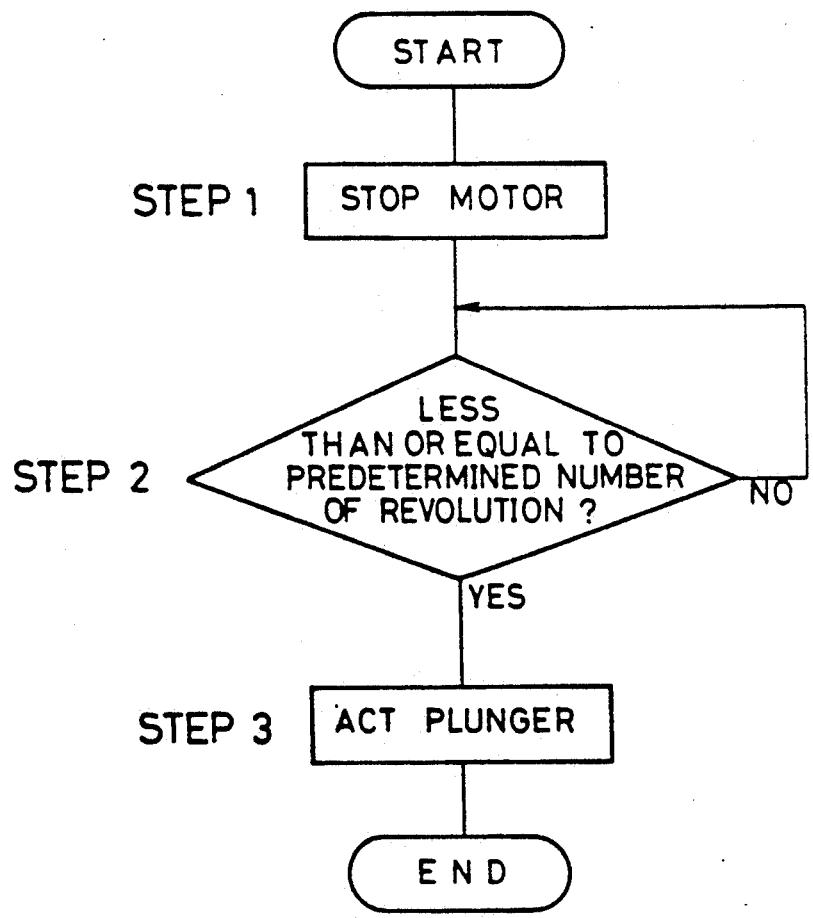
FIG. 15 is a flowchart of the fifth embodiment.

FIGS. 14 and 15 show the fifth embodiment. A notched potion 41 is formed at a predetermined position on the lower surface of a turntable 40 onto which the optical card C is put. A stopper 42 having a tip edge portion adapted to be fitted into the notched portion 41 is arranged below the turntable 40. The stopper 42 is vertically driven by a plunger 43 which is made operative by the control unit 33.

FIG. 15 is a flowchart showing a procedure to align the rotation stopping direction. In step 1, the power supply of the spindle motor 31 is disconnected. Only when the number of revolutions per minute of the spindle motor 31 is equal to or less than a predetermined number of revolutions per minute in step 2, step 3 follows. In step 3, the plunger 43 is made operative.

In the above construction, in a manner similar to the foregoing embodiments, the control unit 33 waits until the number of revolutions per minute of the spindle motor 31 is equal to or less than the predetermined number of revolutions per minute. Next, the plunger 43 is made operative to upwardly move the stopper 42 in the direction which is parallel with the rotating shaft of the spindle motor 31. Then, the rotation of the spindle motor is stopped at the position where the stopper 42 is fitted into the notched portion 41. Due to stopping its rotation, the turntable 40 is set to a predetermined direction, that is, the longitudinal direction of the optical card C coincides with the direction of the guide rails 38 and 39. In this case, since the tip edge portion of the stopper 42 slidingly contacts the lower surface of the turntable 40 until it is fitted into the notched portion 41, it is necessary to set the predetermined speed of rotation to a slightly high value to thereby prevent stopping rotation of the spindle motor due to friction of the sliding contact motion by the friction between the lower surface of the turntable 40 and the tip edge portion of the stopper 42. When the rotation of the spindle motor 31 is restarted, the plunger 43 is made inoperative to release the stopper 42. In the embodiment, the notched portion 41 has been formed on the lower surface of the turntable 40. However, it is also possible to form the notched portion on the side surface of the turntable 40 and to drive the stopper 42 in the horizontal direction. With such a structure, there is no need to provide the sensor to detect the rotating position of the optical card C.

Figure 16:
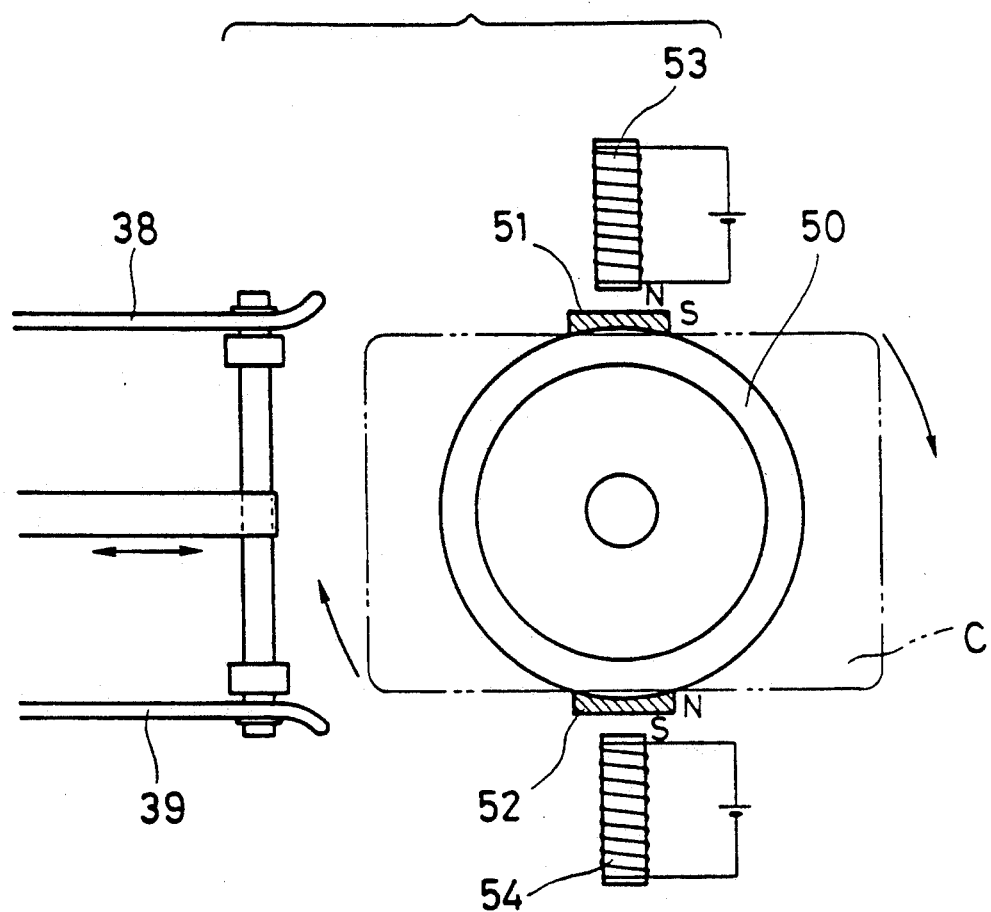
FIG. 16 is a plan view of the sixth embodiment.

FIG. 16 shows the sixth embodiment. Magnets 51 and 52 as magnetic flux generating means are arranged so as to face each other in the outer peripheral portion of a turntable 50. Magnetic poles of the magnets 51 and 52 are arranged so that the S and N poles are directed to the outsides. On the other hand, electromagnets 53 and 54, which form magnetic fields by generating magnetic fluxes by current flowing through their coils are fixed to the main body base plate of the apparatus at positions where the turntable 50 is sandwiched on a straight line which is perpendicular to the rotating shaft of the turntable 50 and to the ejecting direction of the optical card C. The magnetic poles of the electromagnets 53 and 54 are arranged so that the N and S poles, respectively are directed to the insides.

In the above construction, to stop the rotation of the turntable 50, the power supply of the spindle motor to rotate the turntable 50 is disconnected and currents are supplied to the electromagnets 53 and 54. Thus, when the magnets 51 and 52 reach the positions where they face the electromagnets 53 and 54, respectively, magnetic attractive forces are generated, so that the rotation of the turntable 50 is stopped. By using the magnetic attractive forces as mentioned above, the rotation of the turntable can be stopped without coming into contact with the turntable. Therefore, the turntable and the like are not damaged and it is also unnecessary to provide the sensor to detect the rotating position of the optical card C.

Although the above embodiments have been described with respect to the example in which an information recording medium having a rectangular or other non-circular shape is used, the shape of the information recording medium is not particularly limited. The invention can also be applied to other information recording media having any shape such as circular shape, square shape, or the like if the ejecting direction and the inserting direction of the information recording medium need to be coincident or if the direction when the information recording medium is ejected of the medium needs to be aligned to a predetermined direction.

Although the above embodiments have been described with respect to the example in which a sensor is provided near the turntable in order to detect an direction of the information recording medium, the encoder is attached to the spindle motor, and the like are used, it is sufficient that the direction of the information recording medium can be determined indirectly. Therefore, the direction of holding means for holding the information recording medium may be also detected in place of the direction of the medium.

As described above, according to the information recording and/or reproducing apparatus of the present invention, in spite of the fact that it has mechanism to rotate the information recording medium and to read the information therefrom, the ejecting direction of the information recording medium can be made coincident with the inserting direction. Therefore, the apparatus can be easily utilized. Danger of damage to the recording medium can be prevented. The reliability of the automatic ejecting function can be increased.

What is claimed is:

1. An apparatus for effecting at least one of recording of information and reproduction of information comprising:
    a head section for effecting at least one of recording of information and reproduction of information onto/from an information recording medium having a shape other than a circular shape;
    holding means for holding the information recording medium and rotating the medium;
    moving means for moving said holding means in a predetermined direction;
    detecting means for detecting a rotating position of the information recording medium held to said holding means; and
    adjusting means for adjusting the posture of the recording medium in correspondence to an output of said detecting means, wherein when the information recording medium is being ejected out of the apparatus, said adjusting means adjusts the posture of the information recording medium.

2. An apparatus according to claim 1, wherein said information recording medium has a card-like shape.

3. An apparatus according to claim 1, wherein said adjusting means is movable in the direction which is perpendicular to the surface of the information recording medium.

4. An apparatus for effecting at least one of recording of information and reproduction of information, comprising:
    a head section for effecting at least one of recording of information and reproduction of information onto/from an information recording medium;
    holding means for holding the information recording medium and rotating the medium;
    moving means for moving said holding means in a predetermined direction;
    detecting means for detecting a rotating position of the information recording medium held to said holding means; and
    adjusting means for adjusting the posture of the recording medium in correspondence to an output of said detecting means, wherein when the information recording medium is ejected out of the apparatus, said adjusting means adjusts the posture of the information recording medium.

5. An apparatus for effecting at least one of recording of information and reproduction of information, comprising:
    a head section for effecting at least one of recording of information and reproduction of information onto/from an information recording medium;
    holding means for holding the information recording medium;
    driving means for rotating said holding means;
    moving means for moving said holding means;
    detecting means for detecting a rotating position of the information recording medium held to said holding means;
    control means for controlling said driving means and said moving means in correspondence to an output of said detecting means when the information recording medium is being ejected out of said apparatus; and
    guide means for directing the information recording medium in a predetermined direction.

6. An apparatus for effecting at least one of recording of information and reproduction of information, comprising:
    a head section for effecting at least one of recording of information and reproduction of information onto/from an information recording medium;
    holding means for holding the information recording medium;
    driving means for rotating said holding means;
    detecting means for optically detecting a rotating position of the information recording medium held to said holding means; and
    control means for controlling said driving means in correspondence to an output from said detecting means when the information recording medium is being ejected out of the apparatus.

7. An apparatus for effecting at least one of recording of information and reproduction of information, comprising:
    a head section for effecting at least one of recording of information and reproduction of information onto/from an information recording medium;
    holding means for holding the information recording medium;
    driving means for rotating said holding means;

detecting means for optically detecting a rotating position of said holding means; and control means for controlling said driving means in correspondence to an output from said detecting means when the information recording medium is being ejected out of the apparatus.

8. An apparatus for effecting at least one of recording of information and reproduction of information, comprising:

a head section for effecting at least one of recording of information and reproduction of information onto/from an information recording medium;

holding means for holding said information recording medium;

driving means for rotating said holding means; and means for directing said holding means in a predetermined direction by a magnetic attractive force.

9. A method of information processing for effecting at least one of recording of information and reproduction of information, said method comprising the steps of:

holding an information recording medium to holding means;

rotationally driving the holding means so as to rotate the information recording medium;

effecting at least one of recording of information and reproduction of information onto/from the information recording medium which is rotated;

optically detecting a rotating position of the information recording medium; and controlling the posture of the information recording medium in correspondence to the detection result by said detecting step when the information recording medium is being released from the holding means.

10. A method of information processing for effecting at least one recording information and reproduction of information, said method comprising the steps of:

holding an information recording medium to holding means;

rotationally driving the holding means so as to rotate the information recording medium;

effecting at least one of recording of information and reproduction of information onto/from the information recording medium which is rotated;

optically detecting a rotating position of the holding means; and controlling the posture of the information recording medium in correspondence to the detection result of said detecting step when the information recording medium is released from the holding means.

* * * * *

UNITED STATES PATENT AND TRADEMARK OFFICE
CERTIFICATE OF CORRECTION

PATENT NO. : 5,307,338
DATED : April 26, 1994
INVENTOR(S) : KAZUNORI SUZUKI, ET AL.

Page 1 of 3

It is certified that error appears in the above-indentified patent and that said Letters Patent is hereby corrected as shown below:

COVER PAGE

[56] References Cited

FOREIGN PATENT DOCUMENTS

"60-170067 1/1986 Japan" should read
-- 60-170067 9/1985 Japan --.

In the Drawings:
SHEET 1 OF 9

Figure 1

"OFTCAL" should read -- OPTICAL --.

Figure 2

"0" should read -- 10 --, and the broken lead line from reference number 3 should be a continuous line.

COLUMN 1

Line 17, "having. A" should read -- having a --.
Line 20, "mostly" should read -- many --.

UNITED STATES PATENT AND TRADEMARK OFFICE
CERTIFICATE OF CORRECTION

PATENT NO. : 5,307,338
DATED : April 26, 1994
INVENTOR(S) : KAZUNORI SUZUKI, ET AL.

It is certified that error appears in the above-indentified patent and that said Letters Patent is hereby corrected as shown below:

COLUMN 2

Line 59, "of" should read -- for --.
Line 63, "carry out" should be deleted.

COLUMN 3

Line 24, "cross sectional" should read -- cross-sectional --.

COLUMN 4

Line 20, "is" should read -- is positioned --.

COLUMN 6

Line 60, "which" should read -- of --, and after "direction", "of" should read -- which --.

COLUMN 8

Line 59, "coils" should read -- coils, --.

UNITED STATES PATENT AND TRADEMARK OFFICE
CERTIFICATE OF CORRECTION

PATENT NO. : 5,307,338
DATED : April 26, 1994
INVENTOR(S) : KAZUNORI SUZUKI, ET AL.

It is certified that error appears in the above-indentified patent and that said Letters Patent is hereby corrected as shown below:

COLUMN 9

Line 22, "when the infor-" should be deleted.
Line 23, "mation recording medium is ejected" should be deleted.
Line 24, "direction." should read -- direction when the information medium is ejected. --.
Line 27, "an should read -- a --.
Line 37, "has" should read -- has a --.

Signed and Sealed this

Fourth Day of October, 1994

Attest:

BRUCE LEHMAN

Attesting Officer

Commissioner of Patents and Trademarks